April 5, 1966  ITSUO HANDA  3,243,884
MEASURING APPARATUS
Filed Dec. 4, 1962  6 Sheets-Sheet 1
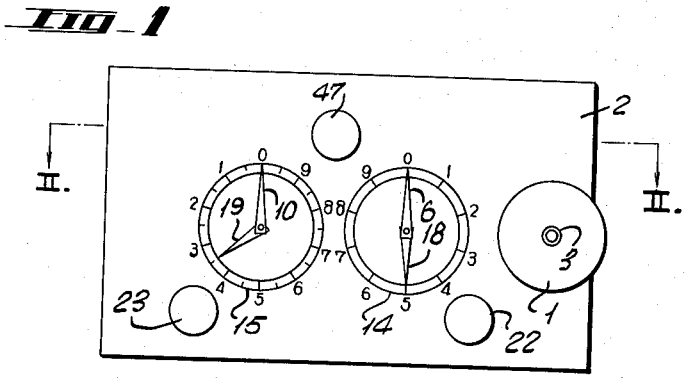
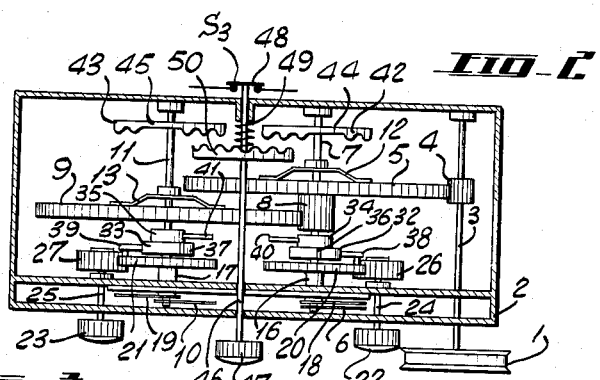
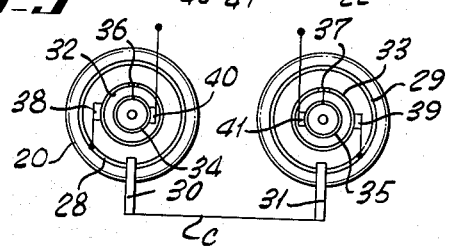
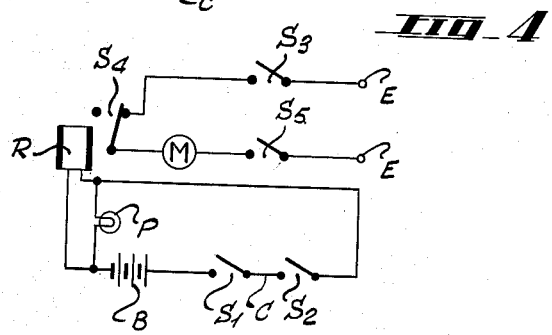
INVENTOR.
ITSUO HANDA
BY Stanley Wolder
ATTORNEY April 5, 1966 ITSUO HANDA 3,243,884
MEASURING APPARATUS
Filed Dec. 4, 1962 6 Sheets-Sheet 2
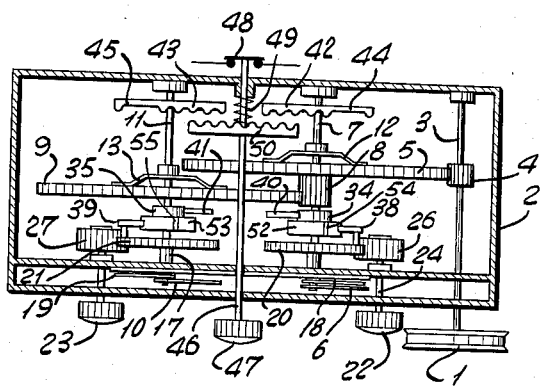
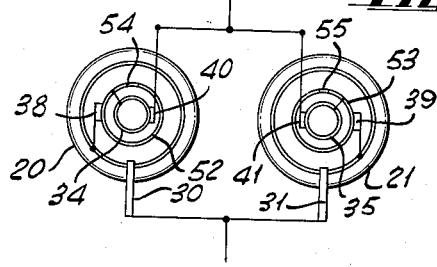
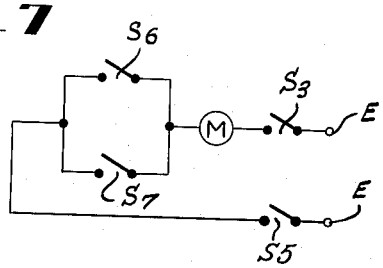
INVENTOR.
ITSUO HANDA
BY Stanley Walder
ATTORNEY April 5, 1966  ITSUO HANDA  3,243,884
MEASURING APPARATUS
Filed Dec. 4, 1962  6 Sheets-Sheet 3

INVENTOR.
ITSUO HANDA
BY Stanley Wolder
ATTORNEY

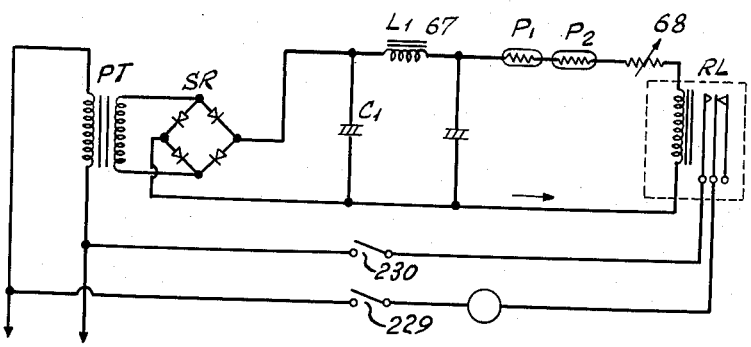
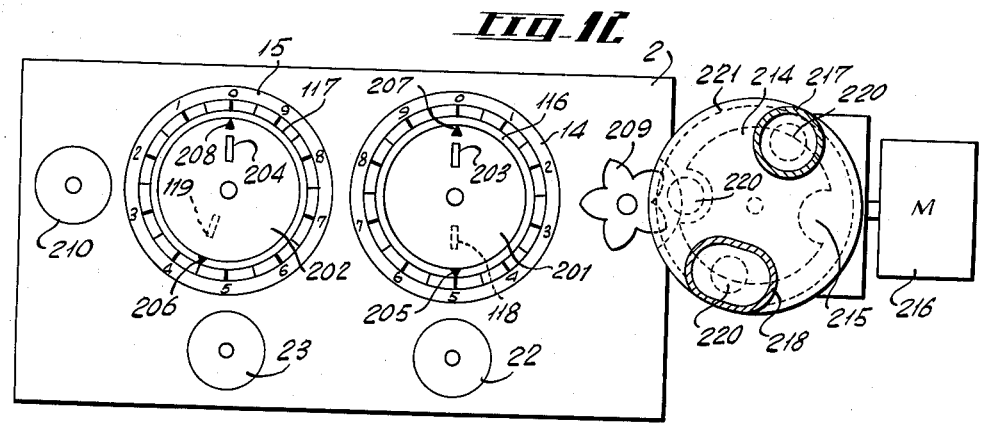
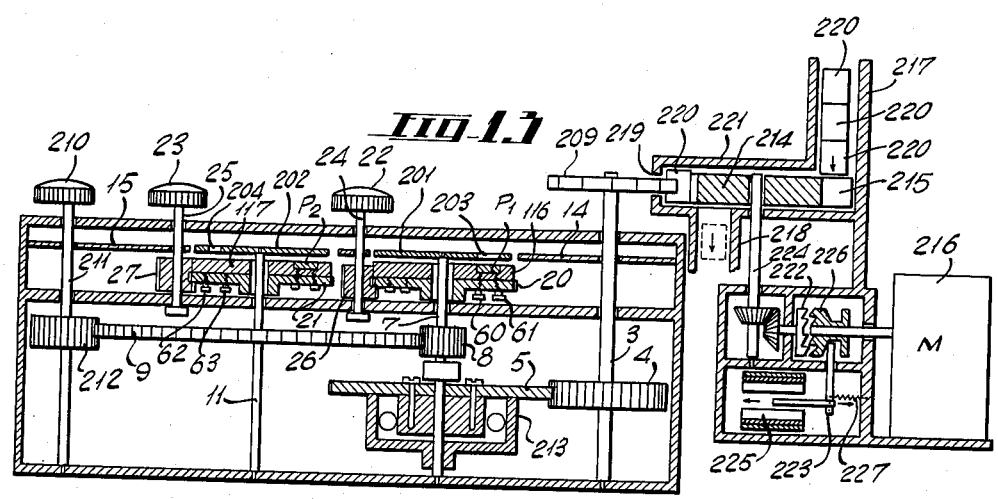
INVENTOR.
ITSUO HANDA
BY Stanley Wolder
ATTORNEY April 5, 1966
ITSUO HANDA
3,243,884
MEASURING APPARATUS
Filed Dec. 4, 1962
6 Sheets-Sheet 5
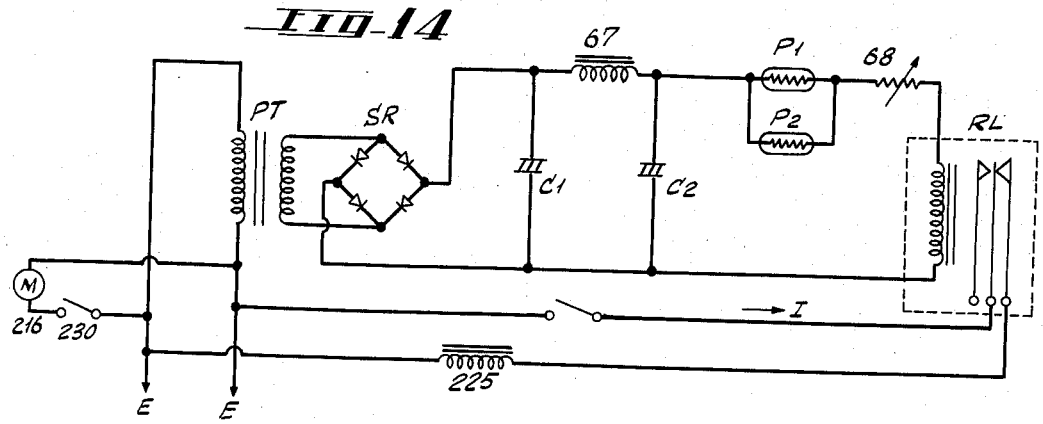
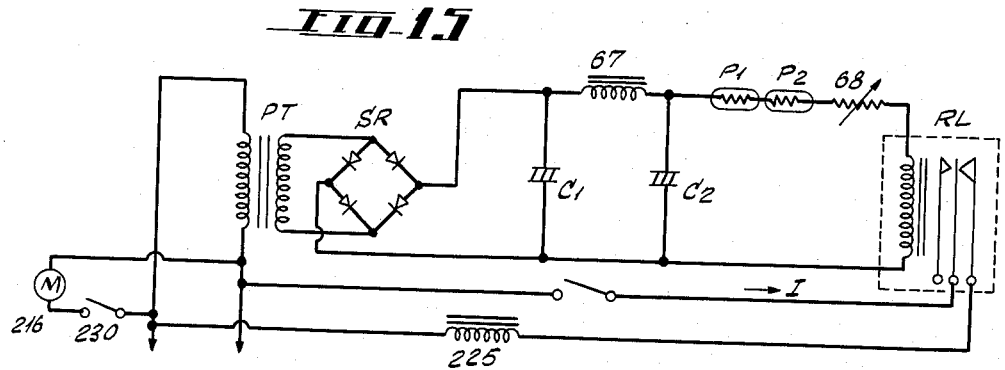
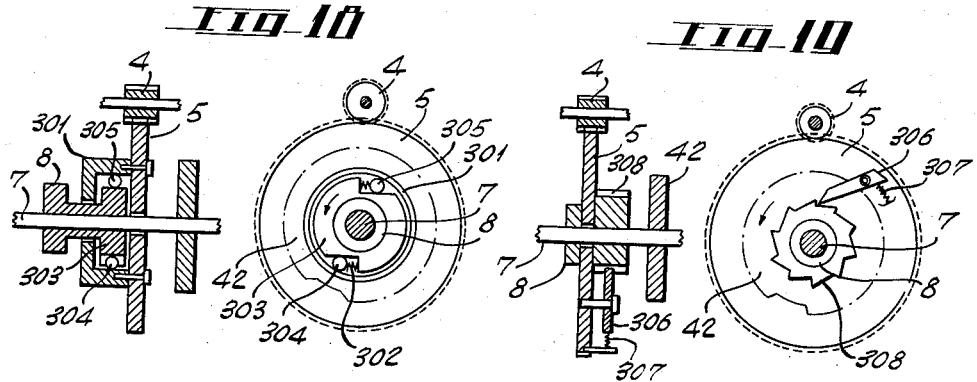
INVENTOR.
ITSUO HANDA
BY Stanley Wolder
ATTORNEY April 5, 1966  ITSUO HANDA  3,243,884
MEASURING APPARATUS
Filed Dec. 4, 1962
6 Sheets-Sheet 6
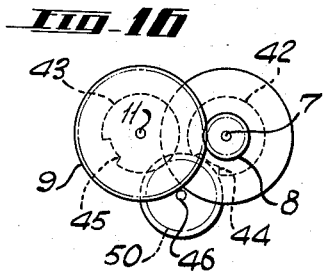
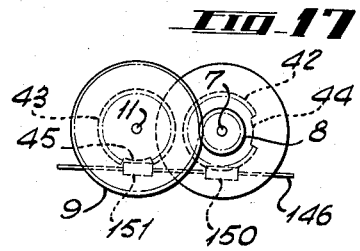
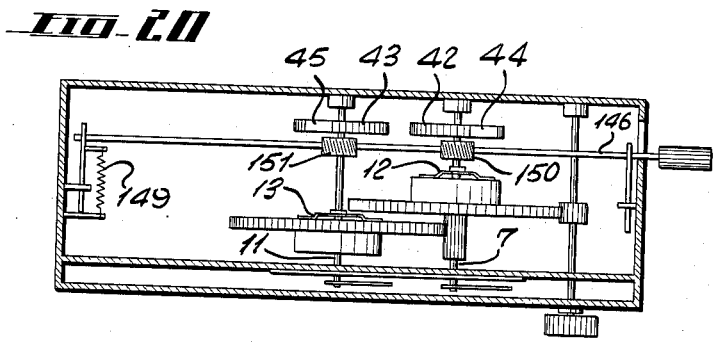
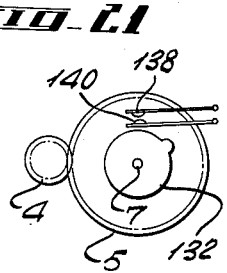
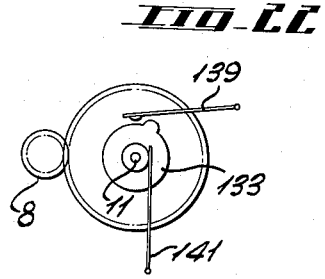
INVENTOR.
ITSUO HANDA
BY Stanley Wilder
ATTORNEY United States Patent Office 3,243,884
Patented Apr. 5, 1966

3,243,884
MEASURING APPARATUS
Itsuo Handa, Kita-ku, Kyoto-shi, Japan, assignor of fifty percent to Goshi Kaisha Takahata Kogyosho, Tokyo, Japan, a corporation of Japan
Filed Dec. 4, 1962, Ser. No. 242,244
15 Claims. (Cl. 33—132)

The present invention relates generally to improvements in apparatus for automatically measuring or metering a predetermined length of a long material such as wire, thread, tape, cord, metallic foil, or the like or for counting the revolutions of a rotating member and further for automatically controlling the operation of apparatus for winding a predetermined length of such material or for effecting a predetermined number of revolutions.

In measuring, checking or dividing a long material to a predetermined length, if said length is comparatively short, a scale of a definite length can be conveniently directly applied to such material positioned in a straight line. However, if the said predetermined length is considerably long, then the above procedure is impractical. In the event not much accuracy is required it has been a practice to wind the long material upon a rotating winding frame having a circumference corresponding to one of several equal parts or one several tenths of the desired predetermined length. This means is, however, not suitable for a high accuracy since the width and thickness of the winding base gradually changes.

In order to measure the revolutions of a machinery shaft, a Veeder counter having an intermittently advancing number wheel, or an electromagnetic counter including such Veeder counter combined with an electromagnet, has been heretofore used. However, such counters have many disadvantages.

Employing a Veeder counter every number wheel engages an intermittently advancing pinion once every rotation and thereby intermittently advances the number wheel indicating the figure of the immediately above place of the number. Therefore, as the rotating speed of the shaft increases, every time one is added to the immediately above place number, a force of a magnitude proportional to said speed is applied to said pinion, that is, a brake of an intensity increasing in proportion to the rotation frequency is applied to the machinery shaft. Accordingly, such an apparatus cannot be used for measuring long material of small tension which is moving at a high speed or the revolutions of a shaft of a small machine which is rotating at a high speed.

The pinion is rapidly worn so that the advance of the number wheel becomes inaccurate, rendering a correct measurement impossible. Accordingly, an apparatus which closes and opens an electric circuit by means of a lever which is actuated in the above manner is unreliable. Where an electromagnetic counter is employed, as the contact is closed for each revolution of the shaft to actuate an electromagnet for advancing the number wheel, the opening and closing of the contact become very frequent, causing considerable wearing of the contact. As the speed of the shaft increases the opening and closing operation of the contact occurs in a shorter time, while a certain minimum time is required between two successive operations of an electromagnet. Therefore, when due to very rapid rotation of the shaft the time required for opening and closing of the contacts becomes shorter than the time necessary for the operation of the electromagnet, then the electromagnet fails to respond to the opening or closing of the contact.

In addition, the pinion wears away in a short time and advance of the number wheel is apt to get inaccurate.

It is thus a principal object of the present invention to provide an improved apparatus for the accurate measuring or metering of predetermined lengths of long materials such as wire, tape, cord, bands, film or the like or the angle of rotation of a revolving member.

Another object of the present invention in to provide an apparatus for measuring or metering lengths of a long material or the rotation of a revolving member wherein said lengths and rotations may be simply and selectively adjusted.

Still another object of the present invention is to provide an apparatus of the above nature in which successive lengths of the long material and rotations of the revolving member may be repeatedly measured or metered at an accurate constant value.

A further object of the present invention is to provide an apparatus of the above nature characterized by its high speed, accuracy, efficiency and reliability.

The above and other objects of the present invention will be understood from the description of the present invention hereinafter set forth and from the advantages of the apparatus in the various uses thereof.

The apparatus of the present invention may be widely applied in actual production or treatment or working of long materials of various kinds, for example, in dividing into predetermined lengths and winding upon winding frames wire, cords, or films to be forwarded; in automatically winding a definite length of wire for making a moving coil or in cutting aluminum foil into equal definite lengths for winding said foil in manufacturing condensers.

For achieving the above objects, there is provided an apparatus which includes a metering or guide wheel which is rotated by the moving long material, or a rotatable element for transmitting the rotation of a shaft, a counting mechanism which transmits the rotation of said guide wheel or rotatable element at successively reduced speeds, index members to be set over the indicating scales of the dials of said counting mechanism, means for electrically controlling the material advancing system in accordance with the set position of said index members and means for returning the counting mechanism to its zero or initial state.

In the application of the present apparatus the operator merely sets the index members to the desired values. When the length of the moving long material being measured or the revolutions of a rotating member has reached the desired value, the material advancing means or rotation can be automatically stopped. When the apparatus is to be recycled, the returning of the counting mechanism and re-actuation of the apparatus are all that is required, all other necessary measuring operations being performed automatically. The apparatus of the present invention will be explained by way of several examples in conjunction with the attached drawings in which:

FIGURE 1 is a front elevational view of an apparatus embodying the present invention;

FIGURE 2 is a sectional view taken along the line II of FIGURE 1;

FIGURE 3 is a partial rear elevational view showing the electrical control system associated with the counting mechanism;

FIGURE 4 is a diagram of the electrical control circuit of the present apparatus;

FIGURE 5 is a view similar to FIGURE 2 of another embodiment of the present invention;

FIGURE 6 is a partial rear elevational view showing the electrical control arrangement associated with the counter mechanism thereof;

FIGURE 7 is a diagram of the electrical control circuit of the arrangement shown in FIGURES 5 and 6;

FIGURE 11 is a diagram showing another electrical control circuit of the apparatus shown in FIGURES 8 and 9;

FIGURE 12 is a front view of another embodiment of the present invention;

FIGURE 13 is a horizontal transverse sectional view thereof;

FIGURE 14 is a diagram of an electrical control circuit network employed therewith;

FIGURE 15 is a diagram of another network which may be substituted for that illustrated in FIGURE 14;

FIGURES 16 to 19 are front elevational views of different mechanisms for returning the counter mechanism to its initial state;

FIGURE 20 is a plan view, partly in section, showing the structure related to the counter returning mechanism of FIGURE 17 as built in the apparatus of the present invention;

FIGURE 21 is a partial rear view showing an example of a control switch associated with the counter mechanism; and FIGURE 22 is a partial rear view showing another example of a control switch associated with the counter mechanism.

Figure 8:
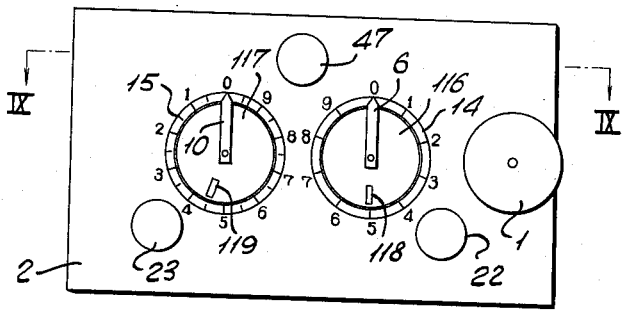
FIGURE 8 is a front elevational view of another embodiment of the present invention.

In the apparatus of the present invention shown in FIGURES 1–4, the reference numeral 1 indicates a measuring or guide wheel for measuring and guiding the moving long material to be measured, which guide wheel is mounted on and projects from the casing 2. The device should be so arranged that any slip between the guide wheel 1 and the moving long material is prevented, and for this purpose it is desirable that the long material engages a sufficient periphery of the guide wheel 1 to inhibit mutual slippage, and if necessary, an idler roll may be spring urged toward the guide wheel 1 through the long material being measured. Secured to the shaft 3 of the guide wheel 1 is a gear 4 of small diameter, which is in engagement with another gear 5 of large diameter secured to the shaft 7 to which is affixed a counter needle 6. The large gear 5 has affixed thereto a gear 8 of small diameter which in turn engages a gear 9 of large diameter secured to the shaft 11 to which is affixed counter needle 10. Clutch defining friction springs 12 and 13 are fixed to shafts 7 and 11 respectively and engage said large gears 5 and 9 respectively. The rotation of the guide wheel 1 is transmitted, through the small gear 4 to the large gear 5, and the consequent rotation of the small gear 8 is transmitted to the large gear 9. Since the large gears 5 and 9 are coupled to the shafts 7 and 11 through friction springs 12 and 13 respectively, a reduced rotation is transmitted from the shaft 3 to the shaft 7, and still further reduced rotation is transmitted to the shaft 11, the counter needles 6 and 10 attached to the shafts 7 and 11 respectively being rotated accordingly.

Generally, with regard to the reduction ratio of this gear train, the use of a decimal relationship is most convenient and facilitates the operation of the apparatus. Therefore it is desirable that the scales 14 and 15 of the needles 6 and 10 respectively should be calibrated from 1 to 10 and further the ratio of the gears 4 and 5 and of the gears 8 and 9 should be 1:10 so that the indications of the needles 6 and 10 correspond to the figures of the first and second places of the measured value respectively. However, the reduction ratio is not necessarily limited to the decimal system, but the use of decimal system greatly facilitates the setting of the index means to be described later and the reading of indications of the counter needles 6 and 10. Of course, for practical use, the counter needles or stages are not limited to two as illustrated in the drawings but can be provided with additional counting stages for indicating figures of higher places such as hundreds and thousands, as occasion demands, with additional reduction gears and accompanying control devices. For simplicity of explanation, however, the description will be limited to measuring and controlling operations employing figures of two places, as shown in the drawing.

The shafts 7 and 11 have sleeves 16 and 17 loosely mounted thereon respectively, which sleeves have fixed thereto index members or needles 18 and 19 registering with the scales 14 and 15, with which the counter needles 6 and 10 also register. The collar shafts 16 and 17 have affixed to their rear ends gears 20 and 21 respectively, which engage gears 26 and 27 secured respectively to shafts 24 and 25 provided with knobs 22 and 23. Accordingly, by manipulation of the knobs 22 and 23, the index members 18 and 19 can be set to any desired position as indicated on the scales 14 and 15. The gears project from the conductor rings 28 and 29 respectively which rings are engaged by brushes 30 and 31 connected to each other. Fixed to shafts 7 and 11 are insulator rings 32 and 33. Conductor pieces or segments 36 and 37 are connected respectively to conductor rings 34 and 35 mounted on the surface of insulator rings 32 and 33 and embedded in said insulator rings 32 and 33 with parts of their surface exposed. Brush members 38 and 39 project from the conductor rings 38 and 29 respectively and respectively engage the peripheries of insulator rings 32 and 33 having conductor pieces 36 and 37 respectively.

For obtaining high accuracy in length measuring or revolution counting said predetermined length or revolution control which are the objects of the present invention, it is preferable that the length of the arc occupied by the conductive pieces 36 and 37 should be as small as possible. However, for the convenience of the setting operation to be described later, it is desirable that the length of said arc should correspond to $\frac{1}{30}$ of that of the whole circumference of the circle and that the positioning thereof should be such that the counter needle 6 is aligned with the advancing front end of rotating conductor piece 36 and further that the counter needle 10 is aligned with the medial axis of the circumference of the conductor piece 37.

Moreover, it is also of advantage that the brush members 38 and 39 should cover about $\frac{1}{30}$ of the whole circumference of said insulator rings 32 and 33 and that said brush members should be so arranged that the index member 18 is aligned with the end of the brush member 38 which is opposite to the direction of the setting rotation thereof, and further that the index member 19 is aligned with the medial axis of the brush member 39.

The numerals 40 and 41 designate brush members which engage the conductor rings 34 and 35 respectively. The two circuit opening and closing arrangements, one including the conductor piece 36 and the brush member 38 which are brought into engagement each rotation of the insulator ring 32 and the other including the conductor piece 37 and the brush member 39 that engage each other each rotation of the insulator ring 33, define two switches $S_1$ and $S_2$ which are series connected in a circuit with a battery B and a relay R, as shown in FIGURE 4. A conductor C connecting the brushes 30 and 31 is connected between the switches $S_1$ and $S_2$ and the brush members 40 and 41 are connected to the battery B and to the relay R respectively. Fixed to the shafts 7 and 11 are gears 42 and 43 respectively, which gears have toothless segments 44 and 45 respectively. A shaft 46 having a knob 47 at the front end and a circuit opening and closing piece 48 at the rear end, is slidably supported for back and forth movement relative to the casing 2 and is normally urged forwardly by a registering spring 49 so that the gear 50 fixed thereto is normally kept out of engagement with said gears 42 and 43 and the circuit opening and closing piece 48 is urged to close a circuit for supplying electric current to the long member advance drive motor M, to be described later. The positions of the toothless segments 44 and 45 of said gears 42 and 43 are so arranged that when the counter needles 6 and 10 indicatae 0 on the scales 14 and 15 respectively, the gear 50 registers with the toothless segments 44 and 45 and rotation of the gear 50 is not transmitted to gears 42 and 43. The circuit opening and closing piece 48, indicated as a switch $S_3$, is connected in series with the drive motor M employed for advancing the long material to be measured or for revolving a rotatable member and a normally closed switch $S_4$ which is actuated by the relay R. Further, as shown in the drawings a power source E for the drive motor M is connected through a manual switch $S_5$ and switches $S_3$ and $S_4$ to the motor M and a pilot lamp or alarm device P for indicating the completion of the measurement is connected across the relay R.

The operation and application of the above-described apparatus is as follows:

First the manual switch $S_5$ is opened, the long material to be measured is wound around the guide wheel 1, and the index members 18 and 19 are set to the respective predetermined point on the scale by rotating the knobs 22 and 23. For example, if the length of the circumference of the guide wheel 1 is one foot and the long material is to be measured or cut at every 35-foot length thereof, first the index member 18 is set to the indication 5 on the scale 14 by swinging the knob 22. This setting is performed through the gear 26 fixed to the shaft 24 and the mating gear 20 mounted on the sleeve 16, and locates the brush member 38 at a corresponding position. Then the index member 19 is set to the indication 3.5 on the scale 15, by swinging the knob 23. This setting is performed through the gear 27 fixed to the shaft 25 and the mating gear 21 mounted on the sleeve 17, the position occupied by the brush member 39 being determined accordingly. In this state the conductor members 36 and 37 and the brush members 38 and 39 are out of engagement with each other respectively. Therefore, the switches $S_1$ and $S_2$ are both open and current is not applied to the relay R. When the manual switch $S_5$ is closed the motor M rotates since the switches $S_3$ and $S_4$, are closed, and the long material is advanced and causes the guide wheel 1 to rotate. The rotation of the guide wheel 1 is transmitted through the shaft 3, the small gear 4, the large gear 5, the friction spring 12, and the shaft 7, to the counter needle 6. At the same time the rotation is transmitted through the small gear 8 and the engaging large gear 9, the friction spring 13, and the shaft 11 to the counter needle 10, as described above.

Each ten rotations of the guide wheel 1 results in one rotation of the counter needle 6, and each time the needle 6 comes into registration with the indication 5 on the scale 14, the conductor piece 36 of the insulator ring 32 rotating together with the shaft 7 engages the brush member 38 and the switch $S_1$ in FIGURE 4 is closed. However, since the shaft 11 rotates at a speed which is 1/10 of that of the shaft 7, the conductor piece 37 does not engage the brush member 39, that is, the switch $S_2$ remains open. Accordingly, the relay R is not energized and is therefore not actuated.

When the shaft 7 has made about 3.3 revolutions, the shaft 11 has completed 0.33 revolution, the revolving conductor piece 37 engages the brush member 39 to close switch $S_2$ the conductor piece 36 engages the brush member 38. As a result, the switches $S_1$ and $S_2$ are closed simultaneously to apply electric current to the relay R and to the pilot lamp P. The pilot lamp P is lit and the relay R is actuated to open the switch $S_4$, interrupting the current to and stopping the motor M.

When the motor M is stopped, the advance of the long material is also stopped. At this time, that point of the long material which coincides with the point where the forward end of the long material was positioned when the long material was initially wound around the guide wheel 1, indicates a length of 35 feet from the said forward end, and cutting the long material at this point, a piece of 35 feet in length is obtained.

If, upon the opening of the switch $S_4$ the power supply circuit to the motor M is broken said motor M is not instantaneously stopped and the armature or other moving elements continue to rotate due to inertia, then it is of advantage to provide another relay in parallel with the relay R and to arrange a brake device which when actuated by said other relay positively stops the movement of the shaft of the motor M or of the attached moving element thereof. By the arrnagement of such brake device, more accurate measurement or cutting may be effected.

In order to repeat the above cycle, the operator depresses the knob 47 against the influence of the spring 49 and rotates it while so depressed. When the knob 47 is depressed, the gear 50 on the shaft 46 is brought into engagement with two gears 42 and 43. The rotation of the knob 47 causes the rotation of the gears 42 and 43, and hence the respective shafts 7 and 11 and the counter needles 6 and 10. Rotation of the shafts 7 and 11 causes accompanying rotation of the insulator rings 32 and 33 fixed thereto. As a result, the conductor pieces 36 and 37 on respective insulator rings 32 and 33 are separated from the brush members 38 and 39 respectively opening the switches $S_1$ and $S_2$ and thus breaking the circuit to the relay R to close the switch $S_4$. However, the power supply circuit to the motor M is not closed as long as the knob 47 is depressed, since the shunt piece 48 is separated from the terminals and the switch $S_3$ is thus kept open.

During the rotation of the shafts 7 and 11 as above, the friction spring 12 on the shaft 7 slips over the rear surface of the large gear 5 without rotating it, and in the same manner, the friction spring 13 on the shaft 11 slips over the rear surface of the large gear 9 without rotating it. This operation is due to the great resistance owing to the engagements of the large gear 9 with the small gear 8, and of the large gear 5 connected to the small gear 8 with the small gear 4 on the shaft of the guide wheel 1, as is well known in clock mechanisms.

When, owing to rotation of shafts 7 and 11 due to rotation of the knob 47, one of counter needles 6 and 10, for example the needle 10, reaches 0 indication on the scale 15, the toothless section 45 of the gear 43 registers with the gear 50. Accordingly, the gear 50 is disengaged from the gear 43, and as the transmission of the rotation of the gear 50 to the gear 43 is stopped, the counter needle 10 comes to rest at the 0 indication. Further rotation of the knob 47 causes further movement of the counter needle 6 until it reaches the 0 indication, when the toothless section 44 of the gear 42 registers with the gear 50, stopping the transmission of the rotation of the gear 50 to the gear 42 and causing idle rotation of the gear 50. Thus, the two counter needles 6 and 10 are returned to their respective initial start or zero positions. Upon subsequent release of the knob 47, owing to the influence of the spring 49 the shaft 46 is returned to its original position, the circuit opening and closing piece 48 moves to close the switch $S_3$ and electric current is thus applied to the motor M so that the long material advancing and metering cycle is repeated.

In order to vary or adjust the metering length the manual switch $S_5$ is opened either before the counter needle in returning operation or before releasing the knob 47 after said returning operation. The motor M is thus dormant thereby permitting the resetting to different position of the index members 18 and 19 for different length measurements without the unnecessary advance of the long material.

In the apparatus shown in FIGURES 1–4, when the predetermined length measurement has been completed, the switches $S_1$ and $S_2$ connected in series in the circuit incorporated in the apparatus are closed, the relay is actuated, the motor for advancing the long material is stopped, and the long material is thus stopped at the position corresponding to the predetermined length. In the embodiment of the present invention shown in FIGURES 5–7, as control means for stopping the operation of the motor, two switches parallel with each other are inserted in the circuit connecting the motor and the power source, the desired object being achieved by the opening of these switches. This modified apparatus is adapted particularly for the control of motors of small power.

Referring to FIGURES 5–7 the various elements are designated by the same numerals as those respectively indicating the corresponding elements in FIGURES 2–4. Since the front view of this apparatus is the same as the previous example, FIGURE 1 may also be referred to. The present embodiment differs from that earlier described principally in the substitution of rings 52 and 53 for the rings 32 and 33 and their association. The ring 52, which together with the conductor ring 34 as previously described on the shaft 7 constitutes a unitary body, is made of a conducting material, is electrically connected to said conductor ring 34, and is provided along a section of its outer circumference with an arc-shaped insulator piece 54. In the same manner, the ring 53, which together with the conductor ring 35 on the shaft 11 constitutes a unitary body, is made of conducting material, is electrically connected to the conductor ring 35; and is provided along a section of its outer circumference with an arc-shaped insulator piece 55. Thus, the switches $S_6$ and $S_7$ consisting of the rings 52 and 53 and the brush members 38 and 39 engaging the outer circumferences thereof respectively are normally closed, and are opened each revolution of the rings 52 and 53 respectively as the brushes 38 and 39 register with the respective insulator pieces 54 and 55 respectively. As shown in FIGURE 7, the switches $S_6$ and $S_7$ connected together in parallel with each other are inserted in a circuit having a switch $S_3$ corresponding to the circuit opening and closing member 48, a material advancing drive motor M and a manual switch $S_5$ in series connection and connected to the power source EE. The arcuate length of each of the insulator pieces 54 and 55 preferably occupy about 1/30 of the whole circumference, and that of each of the contact surfaces of the brush members 38 and 39 preferably cover about 1/60 of same. The arrangement of these brush members should be the same as that in the previous example.

Considering now the operation of the apparatus last described, first the manual switch $S_5$ is opened, then the long material to be measured is wound around the guide wheel 1 and led out. The knobs 22 and 23 are rotated until the index members 18 and 19 are set to the scale value indicating the desired length. For example, if the length of 27 feet is to be measured, the index member 18 is set to register with scale point 7 on the scale 14 and the index member 19 is set to register with the scale point 2.7 and the manual switch $S_5$ is then closed. Since the switch $S_3$, the switch $S_6$ consisting of the conductor ring 52 and the brush member 38 and the switch $S_7$ consisting of the conductor ring 53 and the brush member 39, are normally closed, the drive motor M is actuated to advance the long material which correspondingly rotates the guide wheel 1. The rotation of the shaft 3 is transmitted through reduction gear elements, i.e. the small gear 4 and the large gear 5 to the shaft 7, and this rotation in turn is transmitted through the reduction gears consisting of the small gear 8 and the large gear 9 to the shaft 11. Once in each rotation of the shaft 7, the counter needle 6 registers with the index member 18, and concurrently the arcuate insulator member 54 engages the brush member 38 and the switch $S_6$ consisting of the ring 52 and the brush member 38 is opened. However, the switch $S_7$ in parallel with the switch $S_6$ remains closed since the brush member 39 and the conductor ring 53 are kept in engagement so that the motor continues its operation. Thus when the shaft 7 has made more than two complete rotations, the shaft 11 has made more than 2/10 rotation. When the counter needle 10 on the shaft 11 registers with the index member 19 the arcuate insulator member 55 on the conductor ring 53 engages the brush member 39, whereby the switch $S_7$ is opened. In this state if the counter needle 6 on the shaft 7 comes into registration with the index member 18 the switch $S_6$ is also opened so that supply of electric current to the motor M is stopped and the advance of the long material is stopped. Thus when the necessary measurement has been effected and when the operation is to be resumed, the knob 47 is depressed against the urging of the spring 49 so that the circuit opening and closing piece 48 comes out of contact. While thus keeping the switch $S_3$ open the knob 47 is rotated to reset the apparatus to its zero position, in the manner earlier described.

In the above mentioned example, upon the measurement being effected in accordance with the set position of the index member 18 and 19, the parallel switches $S_6$ and $S_7$ are opened in succession so that the current supply to the motor M is directly interrupted. Accordingly, when the power to be supplied to the motor M is comparatively small, the application of this last apparatus obviates the need for a relay or other accessory devices so that the present object can be attained in a very simple and ready manner.

In the embodiments illustrated in FIGURES 1–4 and FIGURES 5–7, the shaft 46 for resetting counter needles 6 and 10 and the associated elements is parallel to the shafts 7 and 11, as seen in FIGURE 16. The shaft 46 which is in parallel with the two parallel shafts 7 and 11 is moved in an axial direction so that the gear 50 on the shaft 46 engages the two gears 42 and 43 on shafts 7 and 11 respectively. The rotation of the shaft 46 causes the gear 50 to rotate the gears 42 and 43, which transmission of rotation is stopped when the toothless sections 44 and 45 of the gears 42 and 43 respectively register with the gear 50, the counter needles 6 and 10 fixed to shafts 7 and 11 respectively indicating zero.

The zero returning means, are, however, not limited to the above arrangement but may be those illustrated in FIGURES 16 to 20. In a modification shown in FIGURES 17 and 20, the zero returning shaft 146 is positioned in transverse relation to the shafts 7 and 11 and is provided with worms 150 and 151 which engage the gears 42 and 43 respectively. As seen in FIGURE 20, the shaft 146 is urged by a spring 149 in such a manner that said worms 150 and 151 are normally maintained out of engagement with the gears 42 and 43 respectively. By grasping the shaft 146 at its knob carrying end and causing it to shift in the axial direction of the shafts 7 and 11 against the urging of the spring 149, the worms 150 and 151 are brought into engagement with the gears 42 and 43 respectively. Rotation of the shaft 146 under this condition causes the shafts 7 and 11 with respective counter needles 6 and 10 to rotate until the toothless sections 44 and 45 of the gears 42 and 43 respectively register with the worms 150 and 151, when the shafts 7 and 11 cease to rotate and the counter needles 6 and 10 and the associated parts return to respective zero position.

Instead of the arrangement in FIGURE 20, the shaft 146 may be located over or below the gears 42 and 43 so that in the resetting operation the shaft 146 may be shifted down or up respectively to engage the gears 42 and 43.

As shown in FIGURES 18 and 19, by employing a unidirectional coupling device or one way clutch, the counter needle or other measuring member can be readily returned to its zero position.

In FIGURE 18, a drum 301 is coaxially affixed to the gear 5 which is, as aforesaid, rotatably mounted on the counter needle shaft 7, and houses a releasably engaging clutch member 303 which is keyed to the shaft 7 and carries the pinion 8. The member 303 has several triangular cutouts 302 each of which engages a steel ball 304 urged outwardly by a light spring 305. When the cog-lacking gear 42 fixed to the shaft 7 is rotated in the opposite direction of the arrow, even if the gear 5 is in engagement with the pinion 4 in unrotatable condition (due to applied brake, etc.), the counter needle can be readily returned to its zero position.

In FIGURE 19, the gear 5 which can rotate on the counter needle shaft 7 is provided with a pawl 306 urged by a spring 307 into engagement with a ratchet wheel 308. When the cog-lacking gear 42 fixed to the shaft 7 is rotated in the direction of the arrow, even if the gear 5 is in engagement with an immovable pinion 4, the counter needle can be readily returned to zero position.

It is needless to say that in utilizing a ratchet wheel the number of cogs must be equal to that of the scale points of the dial or several integer times such number. Otherwise, due to the pawl-ratchet wheel relation, an accurate zero return of the counter needle would be impossible.

For effecting the automatic resetting of the counter needles 6 and 10 and the associated parts and accordingly a simplified operation of the present apparatus the following arrangement is highly effective. A solenoid is provided and connected in parallel with the relay R shown in FIGURES 1–4. The energization of this solenoid motivates an armature which causes the shaft 146 to be shifted into engagement with the gears 42 and 43 and at the same time closes a contact to supply current to an additional motor for rotating the shaft 146.

Instead of the motor controlling switches $S_1$ and $S_2$ shown in FIGURES 1–4 consisting of brush members 38 and 39 cooperating with conductor pieces 20 and 21 connected to and disconnected from the arcuate conductor pieces 36 and 37 on insulator rings 32 and 33 respectively for opening and closing the circuit of relay R, the corresponding switches as shown in FIGURES 21 and 22 may be employed.

In the structure shown in FIGURE 21, opposed contacts 138 and 140 are carried at the ends of resilient arms projecting from a member rotated with the index member 18 and register with a projection carrying cam 132 which is secured to the shaft 7 so that it can rotate together with said shaft 7. According to this structure the opposed contacts 138 and 140 are opened and the switch $S_1$ is closed each complete rotation of the cam 132 as the cam projection engages a contact carrying arm. In order that the switch $S_1$ closing position can be varied in accordance with the position occupied by the index member 18, the structure is so arranged that the position of the opposed contacts 138 and 140 is shifted according to the movement of the index member 18 along the outer circumference of the cam 132.

In the example shown in FIG. 22, an electrically conductive projection carrying cam 133 is fixed to the shaft 11. A brush member 141 engages the cam 133, and a brush member 139 projects into the path of the cam projection from a part that rotates together with the index member 19. The position of the brush member 139 may be so arranged so that at various positions in accordance with the varaition of the index member 19 it may conduct electricity each rotation of the shaft 11, when it is engaged by the cam projection.

Figure 9:
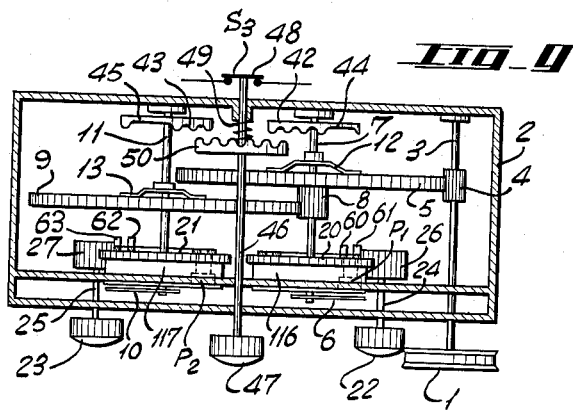
FIGURE 9 is a sectional view taken along the line IX—IX of FIGURE 8.
Figure 10:
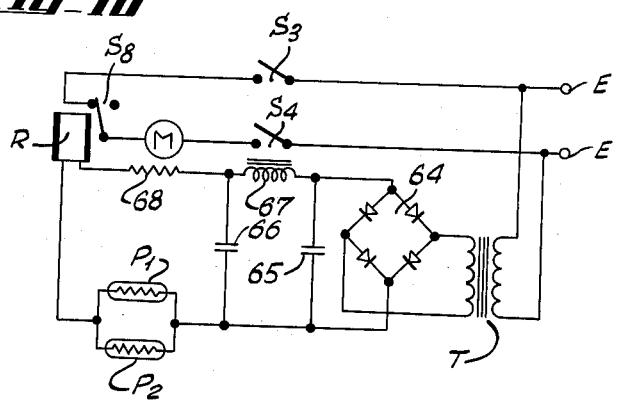
FIGURE 10 is a diagram showing the electrical control circuit of the apparatus shown in FIGURES 8 and 9.

FIGURES 8–15 illustrate an apparatus embodying the present invention for controlling the operation of the drive motor M or of an electric clutch in response to the electrical resistance of a photoelectric element varying with the incident light. In FIGURES 8–10 the same reference numerals as those employed in FIGURES 1–8 designate corresponding members. In the present example, the sleeves 16 and 17 are replaced by drums 116 and 117. Photoelectric elements $P_1$ and $P_2$ are of the photoconductive type formed of cadmium sulfide and are accommodated in the drums with their light sensitive faces registering with slits 118 and 119 formed in the drums 116 and 117 respectively. The terminals of the photoelectric elements $P_1$ and $P_2$ are connected to conductor rings mounted on the rear faces of the drums 116 and 117 respectively. Brush members 60, 61 and 62, 63 are mounted in the casing 2 for connecting these photoelectric elements $P_1$ and $P_2$ to the relay R as shown in FIGURES 10–15. The drums 116 and 117 are provided with gears 20 and 21 in engagement with gears 26 and 27 on the shafts 24 and 25 respectively so that by turning the knobs 22 and 23 the slits 118 and 119 on the drums 116 and 117 can be brought into coincidence with selected scale points on the scales 14 and 15 respectively.

As shown in FIGURES 10, 11, 14 and 15 the photoelectric elements $P_1$ and $P_2$ are parallel or in series to each other and connected to the relay R. A transformer T has a primary connected to the A.C. power source EE and a rectifier 64 is connected to the secondary of said transformer T, a smoothing or filter network consisting of condensers 65 and 66 and a choke coil 67, and limiting resistor 68 being connected to the rectifier output, as illustrated. For convenience in actual use, the width of the slits 118 and 119 and that of the counter needles 6 and 10 and slits 203 and 204 located in counter discs 201 and 202 respectively are so arranged as to correspond to about 1/16 and 1/20 respectively of the circumference of a circle having a radius extending from the rotation centers of the drums 116 and 117 to the outer edge of the slits.

Considering the operation of the apparatus last described in connection with an example wherein the circumference of the guide wheel 1 in FIGURES 8 and 9 is one foot and the metered length of the long material is 45 feet. First the knob 23 is turned until the slit 119 registers with the scale point 4.5 of the scale 15. Since the photoelectric elements $P_1$ and $P_2$ are receiving outer light entering through slits 118 and 119 and are therefore of decreased electrical resistance, sufficient electric current flows through the relay R to maintain it in an actuated state and accordingly the responsive switch $S_8$ is kept closed. Upon closing the manual switch $S_4$, the drive motor M is energized and advances the long material. As the guide wheel 1 rotates with the movement of the long material, the counter needles 6 and 10 rotate. The counter needle 6 covers the slit 118 when the long material has advanced 5 feet and thereafter this covering of the slit 118 occurs at each complete rotation of said counter needle 6, namely at every ten-foot advance of the long material. When this covering occurs, the photoelectric element $P_1$ is shielded from the incident light and its resistance $Pr_1$ reaches the maximum value, while at this time the other photoelectric element $P_2$ parallel to it is still under the incident light so that its resistance $Pr_2$ remains low. Therefore, when $P_1$ and $P_2$ are connected together either parallel as in FIG. 10 or in series as in FIG. 11, the resultant resistance $Pr_3$ due to $P_1$ and $P_2$ does not cause decrease of the current I below the actuation value of the electromagnet relay, and the electromagnet relay R remains actuated. When at the completion of 4.5 revolutions the counter needle 6 covers the slit 118, the other counter needle 10 has completed 4.5/10 revolutions and covers the slit 119. Thus both slits 118 and 119 being covered respectively by both counter needles 6 and 10 at the same time, both photoelectric elements $P_1$ and $P_2$ are shielded from outer light, so that the resistances $Pr_3$ resulting from $P_1$ and $P_2$ of both elements reaches the maximum value and consequently application of electric current to the relay R is minimized and the switch $S_8$ is opened. Consequently, the energizing circuit for the motor M is broken and the movement of the long material is stopped at the length of 45 feet. For resuming the next operation, as in the previous examples, the knob 47 is depressed and under engagement of the gear 50 and the gears 42 and 43, the counter needles 6 and 10 are returned to respective zero position.

Since in the above example control of the drive motor is carried out not by a mechanical operation of contact members but by change of resistance of photoelectric elements, causes of mechanical trouble are scarce and the apparatus is fit for long repeated use.

As mentioned above, being capable of automatic measurement of long material, the apparatus according to the present invention is very effective and advantageous in working on or division for selling of long material.

While in each of the examples as illustrated in the attached drawings the circumference of the guide wheel 1 is one foot, the circumference is not restricted to one foot, and any length may be adopted. If a length of medial value such as 0.5 ft. is adopted for any particular purpose, only the corresponding alteration of the scales 14 and 15 is necessary for attaining the desired object. Instead of the two place number measurement as shown in the illustrated examples, measurement of number of three, four, or more places may of course be carried out by means of further reduction gear mechanisms and correspondingly driven counter needles and associated elements.

The above description relates to measurement and automatic control of long material. As for the revolution control and counting of a machinery shaft, the apparatus is so modified that the guide wheel 1 is replaced by a gear, a pulley or a sprocket, to which gear, pulley or sprocket the rotation of said machinery shaft driven by an electric motor is transmitted. The measurement and automatic control of said machinery shaft can be accomplished in entirely the same manner as that for said long material very readily, accurately and speedily. The following description is made in connection with such apparatus with reference to other examples utilizing photoelectric conductors as shown in FIGS. 12–15.

A disc 214 provided with two cutouts 215 for engaging rollers 220 for roller bearing use is housed in an outer casing 221 having an inlet 217 and an outlet 218 in the upper and lower parts respectively. The outer casing 221 is formed with a cutout at 219, and instead of the aforementioned guide wheel 1, there is provided in register with this cutout a pinion or starwheel 209 secured to the shaft 3 and positioned so that the rollers 220 which are conveyed by the disc 214 rotated by a motor 216, engaged by the cutouts 215 of the disc 214, cause the step rotation of the pinion 209. Then, as the shaft 224 of the disc 214 rotates, due to coupled gears the counter discs 201 and 202 secured to the shafts 7 and 11 respectively are caused to rotate. A slit 203 arranged in the disc 201 comes into registration with a slit 118 every time the disc 201 completes a whole rotation, that is, every time 10 rollers have been conveyed.

For example, if 45 articles are to be counted, the index 205 determining the position of the slit 118 is set to the scale point 5, and another index 206 for the position of the slit 119 is set to the scale point 4.5. Then, when five rollers 220 have been conveyed, $P_1$ is exposed to light and therefore its electric resistance decreases; however, $P_2$ still remains shielded from outer light. Therefore, irrespective of the manner of the connection of $P_1$ and $P_2$, that is, either in parallel shown in FIG. 14 or in series shown in FIG. 15, owing to the resultant $Pr_3$ of $P_1$ and $P_2$, the electric current I does not increase to or over the value necessary for actuating the electromagnetic relay so that the electromagnetic relay still remains open.

When, however, the counter disc 201 has effected 4.5 rotations and the slit 203 and the slit 204 of the counter disc 202 comes into registration with the slits 118 and 119 respectively, both $P_1$ and $P_2$ are exposed to outer light so that the resultant resistance $Pr_3$ of $P_1$ and $P_2$ becomes low, causes the electric current I to increase over the value necessary for actuating the electromagnet relay and hence actuates it.

Accordingly, when the disc 214 has completed 22.5 rotations, that is, when 45 rollers have been conveyed, the electromagnet 225 is energized with electric current enough to actuate it, so that the clutch piece 226 is separated from another clutch piece 222 and conveyance of the rollers 220 is stopped and thereby predetermined number of rollers have been conveyed.

For returning the apparatus to its initial condition ready for starting the next operation, the knob 210 is turned in the same direction to that of the rotation of it at the time of operation until the indices 207 and 208 for slits of counter discs 201 and 202 respectively come to the zero positions of the scales 14 and 15 respectively.

The shaft 211 of the knob 210 is provided with a pinion 212 in mesh with a gear 9 secured to a shaft 11, which gear 9 engages a pinion 8 secured to a shaft 7. As mentioned before, the gear 5 engages, through the one way clutch 213, the pinion 4 so that the counter discs 201 and 202 can be readily returned to zero. Further shown in the drawings are a clutch lever 223, a spring 227 and manual switches 229 and 230.

The above-mentioned examples are only for the purpose of illustrating the essence of the present invention and, without departing from the spirit of the present invention various modifications or design alterations may be made in response to particular purposes.

What is claimed is:

1. A measuring apparatus for long material comprising means for advancing said long material, a measuring wheel adapted to engage said long material and rotate with the advance thereof, a rotatable counter member, a speed reducing mechanism connecting said measuring wheel to said counter member, an adjustable index member, a switch movable between an open and closed position in response to a predetermined relationship between said counter member and said index member, means responsive to said switch for deactivating said material advancing means upon said index member and said counter member assuming said predetermined relationship, means for resetting said counter member to a zero position comprising a first gear connected to and rotatable with said counter member and having a toothless section, a second gear movable into engagement with said first gear and registering with said toothless section when said counter member is in said zero position, and means for selectively rotating said second gear.

2. A measuring apparatus for long material comprising means for advancing said long material, a measuring wheel adapted to engage said long material and rotate with the advance thereof, a shaft, a counter member affixed to said shaft, a speed reducing gear train including a first gear connected to said wheel and a second gear rotatable on said shaft, a clutch member coupling said shaft with said second gear, an adjustable index member, a switch movable between an open and closed position in response to a predetermined relationship between said counter member and said index member, and means responsive to said switch for deactivating said material advancing means upon said index member and said counter member assuming said predetermined relationship, a first reset gear affixed to said shaft and including a toothless section and a second reset gear selectively rotatable and movable into engagement with said first reset gear and registering with said toothless section when said counter member is in its zero position.

3. A measuring apparatus for long material comprising means for advancing said long material, a measuring wheel adapted to engage said long material and rotate with the advance thereof, a rotatable counter member, a speed reducing mechanism connecting said measuring wheel to said counter member, an adjustable index member, a switch movable between an open and closed position in response to a predetermined relationship between said counter member and said index member, and means responsive to said switch for deactivating said material advancing means upon said index member and said counter member assuming said predetermined relationship, said switch including an insulator ring having a short conductor section and being rotatable with said counter member, a conductor ring coaxial and rotatable with said insulator ring, a first brush engaging said conductor ring and a second brush engaging said insulator ring and rotatable with said index member.

4. The apparatus of claim 3 wherein said material advancing means includes an electric motor connected to a source of current through said switch.

5. The apparatus of claim 3 wherein said material advancing means includes an electric motor and said deactivating means includes a relay solenoid connected through said switch to a source of current and a solenoid actuated switch connecting said motor to a source of current.

6. A measuring apparatus for long material comprising means for advancing said long material, a measuring wheel adapted to engage said long material and rotate with the advance thereof, a plurality of rotatable counter members, a speed reducing mechanism connecting said measuring wheel to successive of said counter members to rotate said counter members at successively lower speeds, an adjustable index member associated with each of said counter members, a switch associated with each of said counter members and movable between an open and closed position in response to a predetermined relationship between a respective associated pair of said counter members and index members, and means responsive to said switches for deactivating said material advancing means upon said associated counter members and index members assuming said predetermined relationship, each of said switches including a ring member having an insulator section and a conductor section and being rotatable with a respective counter member, a conductor ring coaxial with and rotatable with said ring member, a first brush engaging each of said conductor rings and a second brush member engaging each of said ring members and rotatable with said index member.

7. The apparatus of claim 6 wherein the speeds of said counter members are related by a factor of ten.

8. The apparatus of claim 6 including means for selectively resetting said counter members to zero positions.

9. The apparatus of claim 6 wherein said material advancing means includes an electric motor and is connected through said switches to a source of current.

10. The apparatus of claim 6 wherein said material advancing means comprises an electric motor and said deactivating means comprises a relay including a solenoid connected to a source of current through said switches and a pair of solenoid actuated contacts connecting said motor to a source of current.

11. The apparatus of claim 6 wherein said material advancing means includes an electric drive motor and an electric clutch movable between an engage and disengage position and actuated in response to said switches.

12. An apparatus for measuring the revolutions of a rotating member, comprising means driving said rotating member, a rotatable pickup member coupled to said rotating member, a shaft, a counter member affixed to said shaft, a speed reducing gear train including a first gear connected to said pickup member and a second gear rotatable on said shaft, a clutch member coupling said shaft with said second gear, an adjustable index member, a switch movable between an open and closed position in response to a predetermined relationship between said counter member and said index member, means responsive to said switch for deactivating said drive means upon said index member and said counter member assuming said predetermined relationship, a first reset gear affixed to said shaft and including a toothless section and a second reset gear selectively rotatable and movable into engagement with said first reset gear and registering with said toothless section when said counter member is in its zero position.

13. A measuring apparatus for long material comprising means for advancing said long material, a measuring wheel adapted to engage said long material and rotate with the advance thereof, a rotatable counter member, a speed reducing mecahnism connecting said measuring wheel to said counter member, an adjustable index member, a switch movable between an open and closed position in response to a predetermined relationship between said counter member and said index member, and means responsive to said switch for deactivating said material advancing means upon said index member and said counter member assuming said predetermined relationship, said switch including first and second coaxial concurrently rotatable electrically connected conductor rings, said first conductor ring having a short insulator section, and first and second brushes engaging said first and second rings respectively, said rings and said first brush being rotatable alternatively with said counter member and said index member.

14. A measuring apparatus for long material comprising means for advancing said long material, a measuring wheel adapted to engage said long material and rotate with the advance thereof, a rotatable counter member, a speed reducing mechanism connecting said measuring wheel to said counter member, an adjustable index member, a switch movable between an open and closed position in response to a predetermined relationship between said counter member and said index member, and means responsive to said switch for deactivating said material advancing means upon said index member and said counter member assuming said predetermined relationship, said switch including a photoelectric element and a shield masking said photoelectric member and having an opening formed therein movable into registry with said photoelectric element, said photoelectric element and said shield being rotatable alternatively with said counter member and index member.

15. A measuring apparatus for long material comprising means for advancing said long material, a measuring wheel adapted to engage said long material and rotate with the advance thereof, a plurality of rotatable counter members, a speed reducing mechanism connecting said measuring wheel to successive of said counter members to rotate said counter members at successively lower speeds, an adjustable index member associated with each of said counter members, a switch associated with each of said counter members and movable between an open and closed position in response to a predetermined relationship between a respective associated pair of said counter members and index members, means responsive to said switches for deactivating said material advancing means upon said associated counter members and index members assuming said predetermined relationship, and means for selectively resetting said counter members to zero positions including a plurality of first gears rotatable with respective of said counter members and each having a toothless section, and a selectively rotatable second gear movable into engagement with said first gears and registering with said toothless sections when said counter members are in their zero positions.

References Cited by the Examiner
UNITED STATES PATENTS

| | | | |
|---|---|---|---|
| 1,021,820 | 4/1912 | Brink | 33—132 |
| 1,286,927 | 12/1918 | Brink | 33—132 |
| 1,622,254 | 3/1927 | Ritter | 33—132 |
| 2,047,353 | 7/1936 | Blanchard | 235—132 |
| 2,134,271 | 10/1938 | Wolkin | 33—132 |
| 2,487,265 | 11/1949 | Nelson | 235—132 |
| 2,652,198 | 9/1953 | Kennedy | 235—132 |

LOUIS R. PRINCE, *Primary Examiner.*

ISAAC LISANN, *Examiner.*

J. RENJILIAN, *Assistant Examiner.*